Fig. I

United States Patent Office 3,192,488
Patented June 29, 1965

3,192,488
MULTIPHASE ELECTROMECHANICAL
OSCILLATOR
Winston O. Faith and Robert L. Marcucci, both of
Garland, Tex., assignors to Varo, Inc.
Filed Oct. 10, 1961, Ser. No. 144,109
2 Claims. (Cl. 331—154)

This invention relates to an electromechanical oscillator.

Presently, electromechanical tuning forks are used to generate constant frequency alternating current signals, and problems are encountered when these tuning fork devices are operated in the presence of linear vibration. Also, there is no effective multiphase electromechanical device now used which is devised as an integrated assembly utilizing mechanical time delay for precision control.

The principal object of the invention is to generate a constant frequency alternating current signal.

Another object is to utilize the undamped natural frequency of rotary oscillation of an inertia wheel and torsion spring assembly to generate a constant frequency alternating current signal.

A further object is to provide a device for symmetrical rotary construction so that effects of linear vibraton forces will be cancelled and will thus have little effect on the operation of the device.

A still further object of this invention is to provide an improved multiphase electromechanical oscillator.

Still another object of the invention is to utilize the time delay encountered in a torsion spring as a result of the action generated by a rotary oscillation of an inertia wheel and torsion spring assembly to generate a constant frequency multiphase alternating current signal.

Yet another object of the invention is to provide a multiphase electromechanical oscillator devised as an integrated assembly utilizing mechanical time delay for precision control.

Further objects of this invention will be apparent to those skilled in the art from consideration of the following description taken in connection with the accompanying drawings.

Figure 1:
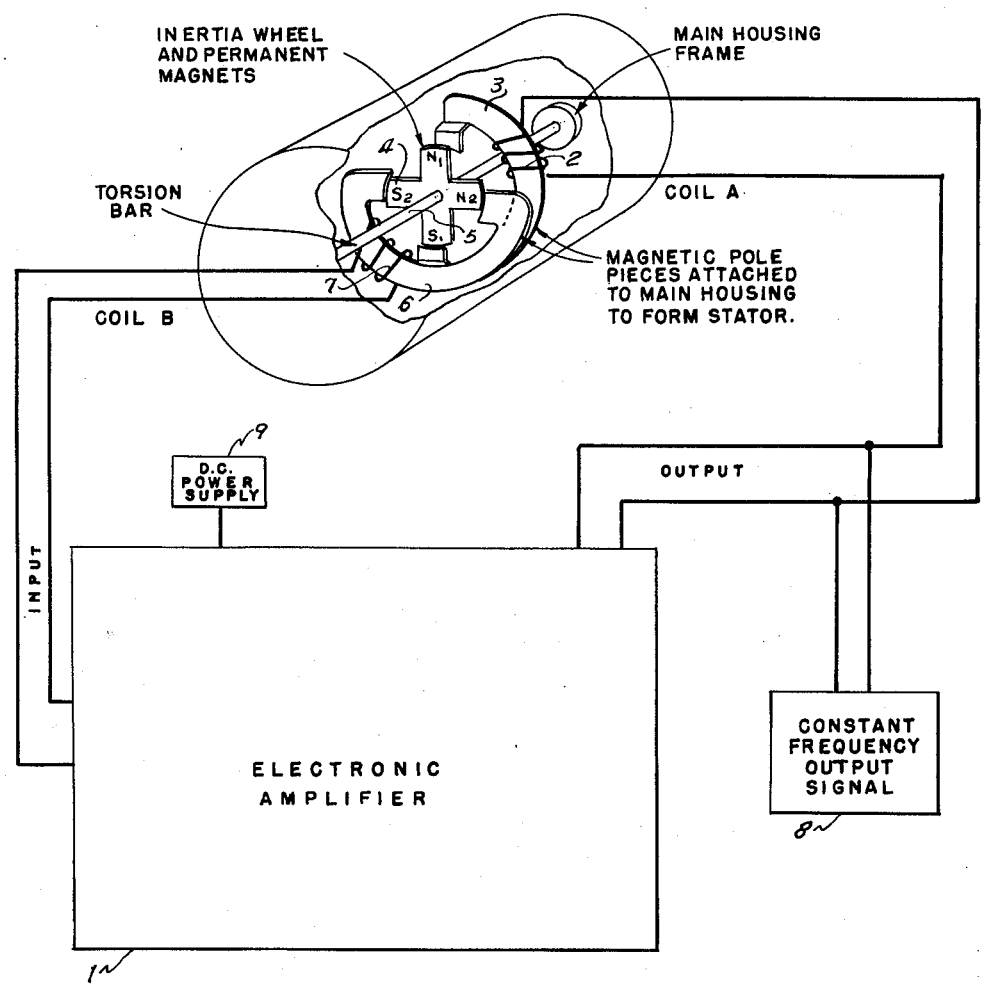
FIGURE 1 is a view of the basic electromechanical oscillator.

Referring to FIGURE 1, it is seen that the oscillator comprises an electromechanical assembly of a rotor and a stator.

Rotary inertia wheel 4, torsion spring shaft 5, and permanent magnets $N_1S_1$ and $N_2S_2$ embedded in the inertia wheel 4, or integral therewith, together form a rotor assembly suspended by the torsion spring shaft 5.

The torsion spring shaft 5 is rigidly affixed to the main housing frame.

The stator assembly is composed of the main housing frame, magnetic pole pieces 3 and 6 which are attached to the main housing, and electromagnetic coils 2 and 7.

Electromagnetic coil 2 is driven by an electrical signal from electronic amplifier 1.

Electromagnetic coil 7 supplies the input signal to electronic amplifier 1.

In operation, the output of the electronic amplifier 1 supplies alternating current to electromagnetic coil 2 to establish a magnetic field in magnetic pole piece 3 which alternately repels and attracts the permanent magnet $N_1S_1$, thus causing the rotary inertia wheel 4 to try to rotate alternately clockwise and counerclockwise. The rotation of rotary inertia wheel 4 is restrained by the torsion spring shaft 5, and, as a result, the attempted rotation becomes a rotary oscillation through a few degrees of angle about the neutral position of the torsion spring shaft 5.

This oscillation imparted to permanent magnet $N_2S_2$ generates a magnetic field in magnetic pole piece 6 which in turn generates an alternating current in electromagnetic coil 7. This alternating current is used as the input to electronic amplifier 1.

The current input to the electronic amplifier 1 is amplified, drawing power from the direct current power supply 9, to establish the output current.

Output current from the electronic amplifier 1 not only drives coil 2 to complete the oscillating loop, but also provides the constant frequency output signal 8, the constant frequency source.

Frequency of oscillation is determined by the undamped natural frequency of the rotor assembly which is a function of the rotary mass of the rotary inertia wheel 4 and the rotary spring constant of the torsion spring shaft 5. Undamped natural frequencies can be provided at any value from 10 to 3000 cycles per second and higher.

As an example of the ability to construct a torsion bar rotary mass essembly having natural frequencies below 20 cycles per second, one may refer to the construction of most modern rate gyroscopes which utilize a torsion bar as a rotary spring. The undamped natural frequency in these gyroscope devices ranges from 10 cycles per second to 400 cycles per second.

The upper limit of undamped natural frequencies which may be provided is not known at this time, but it is above 3000 cycles per second.

The assembly may be filled with low viscosity, high density oil to reduce damage to torsion bars under high linear shock load. Further the low viscosity, high density oil is utilized for viscous damping to obtain slower movements and thus a lower frequency rate. This viscous damping produces controlled modes of operation or relatively slow modes of operation normally unobtainable with the same size or mass.

Figure 2:
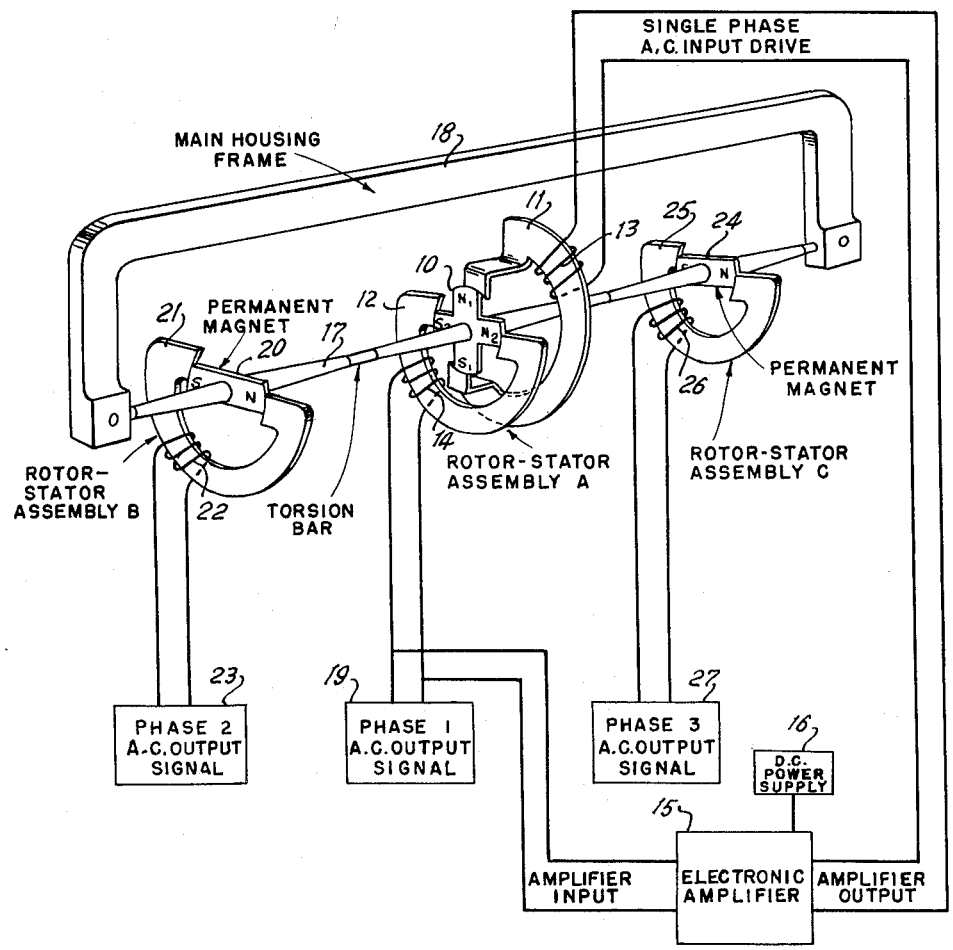
FIGURE 2 is a view of a multiphase electromechanical oscillator in accordance with the invention.

Turning to FIGURE 2, the basic principle embodied in the single phase electromechanical oscillator of FIGURE 1 is seen applied to a multiphase electromechanical oscillator. The time delay encountered in a torsion spring as a result of the action generated by a rotary oscillation of an inertia wheel and torsion spring assembly is utilized to generate a constant frequency multiphase alternating current signal.

Rotor-stator assembly A is comprised of a rotary inertia wheel 10, torsion bar 17, permanent magnets $N_1S_1$ and $N_2S_2$, the main housing frame, a portion of which is shown as main housing frame 18, magnetic pole pieces 11 and 12 which are attached to the main housing (not shown), and electromagnetic coils 13 and 14.

Torsion bar 17 is rigidly affixed to the main housing frame 18.

Rotor-stator assembly B is comprised of permanent magnet 20, torsion bar 17, the main housing frame, a portion of which is shown as main housing frame 18, magnetic pole piece 21 attached to the main housing (not shown), and electromagnetic coil 22.

Rotor-stator assembly C is comprised of permanent magnet 24, torsion bar 17, the main housing frame, a portion of which is shown as main housing frame 18, magnetic pole piece 25, attached to the main housing (not shown), and electromagnetic coil 26.

Going through a cycle of operation, the output of the electronic amplifier 15 supplies alternating current to electromagnetic coil 13 to establish a magnetic field in magnetic pole piece 11 which alternately repels and attracts the permanent magnet $N_1S_1$, thus causing the rotary inertia wheel 10 to try to rotate alternately clockwise and counterclockwise. The rotation of rotary inertia wheel 10 is restrained by the torsion bar 17, and, as a result, the attempted rotation becomes a rotary oscillation through a few degrees of angle about the neutral position of the torsion bar 17.

This oscillation imparted to permanent magnet $N_2S_2$ generates a magnetic field in magnetic pole piece 12 which in turn generates an alternating current in electromagnetic coil 14. This alternating current is used as the input to electronic amplifier 15 and also provides the phase 1 A.C. output signal 19.

The current input to the electronic amplifier 15 is amplified, drawing power from the direct current power supply 16, to establish the output current.

Output current from electronic amplifier 15 provides the single phase alternating current input drive for electromagnetic coil 13.

Frequency of oscillation is determined as provided above in the discussion of FIGURE 1.

As rotary inertia wheel 10 rotates, permanent magnets 20 and 24 are affected through the torsion bar 17. For example, when rotary inertia wheel 10 rotates clockwise a small amount, the rotary action twists the torsion bar 17 clockwise. The torsion bar 17 in turn twists permanent magnets 20 and 24 clockwise imparting clockwise (negative) moments to permanent magnets 20 and 24. Likewise, when rotary inertia wheel 10 rotates counterclockwise a small amount, the rotary action twists the torsion bar 17 counterclockwise. The torsion bar 17 in turn twists permanent magnets 20 and 24 counterclockwise, imparting counterclockwise (positive) moments to permanent magnets 20 and 24.

By proper shaft design of torsion bar 17, a fixed predetermined time delay results. Thus a rotation of permanent magnets 20 and 24 delayed in time with respect to the rotation of rotary inertia wheel 10 is produced. Le Chatelier's law on equilibrium bears out this action.

The rotary oscillation of permanent magnet 20 generates a magnetic field in magnetic pole piece 21 which in turn generates an alternating current in electromagnetic coil 22. This alternating current provides the phase 2 A.C. output signal 23.

The rotary oscillation of permanent magnet 24 generates a magnetic field in magnetic pole piece 25 which in turn generates an alternating current in electromagnetic coil 26. This alternating current provides the phase 3 A.C. output signal 27.

By the proper design of the torsion bar 17, rotary inertia wheel 10, and magnets 20 and 24, the desired phase time relationship can be achieved between the three outputs from magnetic pole pieces 12, 21, and 25.

This same principle can be applied to any desired number of phases, being limited to practical construction mandates, such as size, efficiency, etc.

While we have shown a particular embodiment of our invention, it will, of course, be understood that we do not wish to be limited thereto, since many modifications in the circuit arrangement and the structure may be made, and we contemplate by the appended claims to cover all such modifications as fall within the true spirit and scope of our invention.

What is claimed is:

1. A multiphase electromechanical oscillator comprising a housing, a torsion spring shaft rigidly secured at its ends within the housing, and a number of rotor-stator assemblies: the first roto-stator assembly, including a rotary inertia wheel having four radiating arms mounted on the torsion spring shaft, permanent magnets disposed in the arms of the rotary inertia wheel, two magnetic pole pieces attached to the housing, electromagnetic coils wound around the magnetic pole pieces, and an electronic amplifier; and the other rotor-stator assemblies each including a permanent magnet mounted on the torsion spring shaft, a magnetic pole piece attached to the housing, and an electromagnetic coil wound around the magnetic pole piece; wherein the output of the electronic amplifier of the first rotor-stator assembly supplies alternating current to one of the electromagnetic coils of the first rotor-stator assembly establishing a magnetic field in the magnetic pole piece which such coil entwines thereby alternately repelling and attracting one of the permanent magnets disposed in the rotary inertia wheel causing the rotary inertia wheel to try to rotate alternately clockwise and counterclockwise as a result of which oscillation is imparted to the other permanent magnet disposed in the rotary inertia wheel and a magnetic field is generated in the other magnetic pole piece of the first rotor-stator assembly which in turn generates an alternating current in the electromagnetic coil entwining said magnetic pole piece which alternating current is used as the input to the electronic amplifier and provides the phase 1 A.C. output signal; and wherein the permanent magnets of the other rotor-stator assemblies being mounted on the torsion spring shaft are each twisted as the rotary inertia wheel of the first rotor-stator assembly rotates so that a rotation of the permanent magnets of the other rotor-stator assemblies delayed in time with respect to the rotation of the rotary inertia wheel of the first rotor-stator assembly is produced and the rotary oscillation of each such permanent magnet generates a magnetic field in the magnetic pole piece of its rotor-stator assembly which in turn generates an alternating current in the electromagnetic coil entwining such magnetic pole piece which alternating current provides another phase A.C. output signal.

2. An electromechanical oscillator as described in claim 1 having a three phase output wherein there are two other rotor-stator assemblies in addition to the first rotor-stator assembly and also including a low viscosity high density oil to fill the housing, thereby reducing damage to the torsion spring shaft under high linear shock and providing viscous damping to obtain relatively slow modes of operation.

References Cited by the Examiner

UNITED STATES PATENTS

| | | | |
|---|---|---|---|
| 2,623,084 | 12/52 | Schlumberger et al. | 324—154 X |
| 2,778,998 | 1/57 | Harris | 324—154 X |
| 2,895,095 | 7/59 | Guyton | 58—28 X |

FOREIGN PATENTS

| | | |
|---|---|---|
| 1,096,488 | 1/61 | Germany. |
| 336,770 | 4/59 | Switzerland. |

ROY LAKE, *Primary Examiner.*

JOHN KOMINSKI, *Examiner.*